US011231061B2

(12) United States Patent
Morimoto (10) Patent No.: US 11,231,061 B2
(45) Date of Patent: Jan. 25, 2022

(54) MODULAR FURNITURE ARRANGEMENT COMPRISING ELECTRICALLY AND MECHANICALLY CONNECTABLE MODULE FURNITURE PARTS

(71) Applicant: ABSOLUTE MODULE OY, Renko (FI)

(72) Inventor: Teppei Morimoto, Metsäkansa (FI)

(73) Assignee: ABSOLUTE MODULE OY, Renko (FI)

( * ) Notice: Subject to any disclaimer, the term of this patent is extended or adjusted under 35 U.S.C. 154(b) by 679 days.

(21) Appl. No.: 16/106,084

(22) Filed: Aug. 21, 2018

(65) Prior Publication Data
US 2019/0010970 A1 Jan. 10, 2019

Related U.S. Application Data

(63) Continuation of application No. PCT/FI2017/050124, filed on Feb. 26, 2017.

(30) Foreign Application Priority Data

Feb. 29, 2016 (FI) .................................... 220165157

(51) Int. Cl.
*F16B 12/10* (2006.01)
*H01R 13/20* (2006.01)
(Continued)

(52) U.S. Cl.
CPC ............ *F16B 12/10* (2013.01); *A47B 87/001* (2013.01); *F16B 1/00* (2013.01); *F16B 5/0084* (2013.01);
(Continued)

(58) Field of Classification Search
CPC ........................ F16B 2001/0064; F16B 21/02; F16B 5/0084; F16B 5/0092; F16B 5/07;
(Continued)

(56) References Cited

U.S. PATENT DOCUMENTS 1,966,379 A * 7/1934 Dodge .................. H01R 25/14
439/216
2,611,800 A * 9/1952 Naughton ............ H01R 25/162
439/216
(Continued)

FOREIGN PATENT DOCUMENTS

EP 0718943 A2 6/1996
IN 201817035932 9/2018
(Continued)

*Primary Examiner* — Jonathan P Masinick (57) ABSTRACT

The object of the invention is a modular furniture arrangement comprising electrically and mechanically attachable module furniture parts (101). The modular furniture arrangement comprises for fixing modular furniture parts (101) to each other and for conducting electricity to the at least one surface level of the module furniture part at least two module furniture parts (101) attachable electrically and mechanically to each other, into which is formed at least two mutually electrically insulated electrically conductive supporting structure (102), and at least two attachment components (103) for mechanical fastening of support structures (102) of the module furniture parts (101) to each other and for conducting electricity between the modular furniture parts (101), and to be attached to the attachment components (103) of the modular furniture parts (101) and conducting electricity in the direction of the surface of the module furniture part at least two clamping components (104) for fixing the support structures (102) via the attachment component (103) to each other.

14 Claims, 10 Drawing Sheets

(51) Int. Cl.
*A47B 87/00* (2006.01)
*F16B 1/00* (2006.01)
*F16B 5/00* (2006.01)
*H01R 25/16* (2006.01)

(52) U.S. Cl.
CPC ...... *H01R 13/20* (2013.01); *F16B 2001/0064* (2013.01); *F16B 2012/106* (2013.01); *H01R 25/162* (2013.01)

(58) Field of Classification Search
CPC .... A47B 87/001; H01R 13/20; H01R 13/213; H02G 3/00; H02G 3/36; H02G 3/38
See application file for complete search history.

(56) References Cited

U.S. PATENT DOCUMENTS

| | | | | |
|---|---|---|---|---|
| 2,666,907 | A * | 1/1954 | Hensley, Jr. | H01R 25/006 439/111 |
| 2,669,632 | A * | 2/1954 | Hammerly | H01R 25/14 200/550 |
| 5,607,317 | A * | 3/1997 | King | H02G 3/00 439/211 |
| 7,614,896 | B2 * | 11/2009 | Johnson | H02G 3/00 439/120 |
| 9,166,308 | B2 * | 10/2015 | Byrne | H01R 25/00 |
| 9,225,101 | B2 * | 12/2015 | Byrne | H01R 25/168 |
| 9,976,586 | B2 * | 5/2018 | Morimoto | A47D 15/00 |
| 10,283,952 | B2 * | 5/2019 | Dombrowski | H02G 3/34 |
| 2015/0251104 | A1 * | 9/2015 | Lange | A63H 33/046 446/92 |

FOREIGN PATENT DOCUMENTS

| | | |
|---|---|---|
| JP | S48103328 U | 12/1973 |
| JP | 2018-544193 | 1/2021 |
| WO | 2004/057716 A1 | 7/2004 |

* cited by examiner

MODULAR FURNITURE ARRANGEMENT COMPRISING ELECTRICALLY AND MECHANICALLY CONNECTABLE MODULE FURNITURE PARTS

The present application is a U.S. continuation application based on International Application No. PCT/FI2017/050124 filed on Feb. 26, 2017, which claims priority from. Finland patent Application No. 20165157 filed on Feb. 29, 2016. The entire contents of which are incorporated herein by reference.

FIELD OF THE INVENTION

In societies's infrastructure is used for a variety of furniture in very many different places such as offices, homes, hospitals, schools, production lines, assembly line and restaurants, as well as short-term installable furniture arrangements for example in exhibitions, or as long-term uses in inner walls of premises and buildings.

PRIOR ART

In general, the prior art furniture are assembled by conventional screw joints and various mechanical joints to which have not been added conducting of electricity as their use function. Thus, transferring of electricity in the vicinity of the furniture or inside the furniture or for example through the surface of the furniture is impossible to be implemented without the need of separate electrical cables, connectors and bushings. Auxiliary components of furniture restrict the use of the furniture and make outlook of the furniture untidy. The closest prior art technology FI20145752 has achieved the modular furniture arrangement, but is not focused at all to transfer electricity from inside the furniture to surface of the furniture by integrated attachment technology.

SUMMARY OF THE INVENTION

The object of the invention is to utilize electricity network integrated inside modular furniture arrangement in which can be transferred electricity by using attachment mechanisms of isolated structures to the surface of the furniture at different positions, and from modular furniture part to another. This is achieved by a modular furniture arrangement comprising electrically and mechanically attachable module furniture parts. The modular furniture arrangement comprises for fixing modular furniture parts to each other and for conducting electricity to the at least one surface level of the module furniture part at least two module furniture parts attachable electrically and mechanically to each other, into which is formed at least two mutually electrically insulated electrically conductive supporting structure, and at least two attachment components for mechanical fastening of support structures of the module furniture parts to each other and for conducting electricity between the modular furniture parts, and to be attached to the attachment components of the modular furniture parts conducting electricity in the direction of the surface of the module furniture part at least two clamping components for fixing the support structures via the attachment component to each other.

For fixing modular furniture parts together and for transferring electricity onto at least one surface level of the modular furniture part, the invention is based on modular furniture parts attachable electrically and mechanically to each other and on at least two mutually electrically insulated electrically conductive supporting structure formed inside the modular furniture parts. The invention is also based on the use of the attachment components to mechanically attach support structures of modular furniture parts to each other, as well as for conducting electricity between the modular furniture parts.

The benefit of the invention is that onto the surface of the modular furniture arrangement it is possible to connect or fix a variety of electric devices without wires or separate fasteners. One benefit is that the invention enables electrical fixing or switching of different kind of electric devices to different sides of modular furniture structure, i.e. the modular furniture arrangement, almost to any attachment junction in the entity of the furniture structure. The main benefits of the invention are also electrical safety, hygiene and aesthetics, which are greatly improved as use of wirings and various fasteners decreases.

DETAILED DESCRIPTION OF THE INVENTION

In the embodiments according to the invention is implemented an attachment mechanism of an electrical device, which is mechanically and electrically fixable onto surface of the module furniture part in order to integrate electrical network to the foxing means and provide an actuator fixed onto the surface of the furniture with needed use voltage.

In FIGS. 1-20 are presented exemplary embodiments according to the present invention.

Modular furniture arrangement comprises electrically and mechanically attachable module furniture parts 101. In order to attach them the modular furniture arrangement comprises for fixing modular furniture parts 101 to each other and for conducting electricity to the at least one surface level of the module furniture part, at least two module furniture parts 101 attachable electrically and mechanically to each other, into which is formed at least two mutually electrically insulated electrically conductive supporting structure 102. The modular furniture arrangement comprises at least two attachment components 103 for mechanical fastening of support structures 102 of the module furniture parts 101 to each other and for conducting electricity between the modular furniture parts 101. Furthermore, the mechanical furniture arrangement can comprise at least two clamping components 104 for fixing the support structures 102 via the attachment component 103 to each other to be attached to the attachment components 103 of the modular furniture parts 101 and for conducting electricity in the direction of the surface of the module furniture part.

In some embodiments of the invention the modular furniture arrangement can also comprise at least one electric actuator 105 operating by electricity and at least one clamping component 104 for fixing the actuator 105 to the surface of the module furniture part 101 by adjusting the component length and for conducting electricity from the module furniture part 101 to said actuator 105 for its use.

In the exemplary embodiments of the invention the modular furniture arrangement can comprise an attachment component 103 that fix the support structures of modular furniture parts 101 to each other via a groove formed to an attachment surface of the module furniture parts 101 by using a tool 150 with the attachment component 103 for performing said fixing of the support structures. A threaded fastening hole 122 can be formed to the attachment component 103, and the support structures 102 of the modular furniture parts 101 fix to each other by rotation movement via the threaded fastening hole 122. According to the embodiment the attachment component 103 can be made of an electrically nonconductive material or of an electrically conductive material.

The modular furniture arrangement can further comprise a clamping component 104, which fix to the attachment component 103 via a thread and fix the support structures 102 of the module furniture parts 101 to each other. In some embodiments of the invention the modular furniture arrangement can comprise a clamping component 104, and the actuator 105 is fixed to the surface of the module furniture part 101 by increasing length of the locking component, and the actuator is electrically connected to the modular furniture arrangement. The clamping component 104 can have a rotating shaft, and in the end of which is eccentric shape, that locks the support structures 102 of the module furniture part 101 when the clamping component 104 is rotated.

In some embodiments according to the invention the modular furniture arrangement can comprise an actuator, which is fixable to surface of the module furniture part 101 with screws 104, the actuator receiving electricity for its operation via the screws 104.

Figure 1:
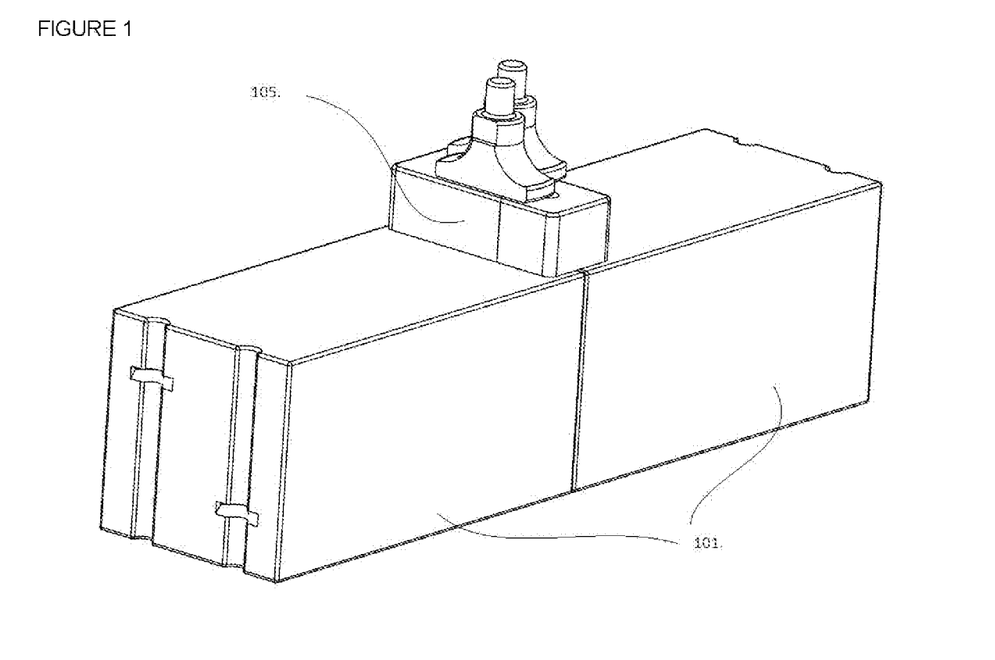
FIG. 1 presents an exemplary overview of an assembly figure of the furniture arrangement according to the invention.

In the following is presented different kinds of detailed embodiments according to the invention related to FIGS. 1-20:

FIG. 1 presents an overview of an assembly figure of the invention, where two module furniture parts 101 are attached together and an exemplary actuator is switched onto surface of a joint area of module furniture parts 101.

Figure 2:
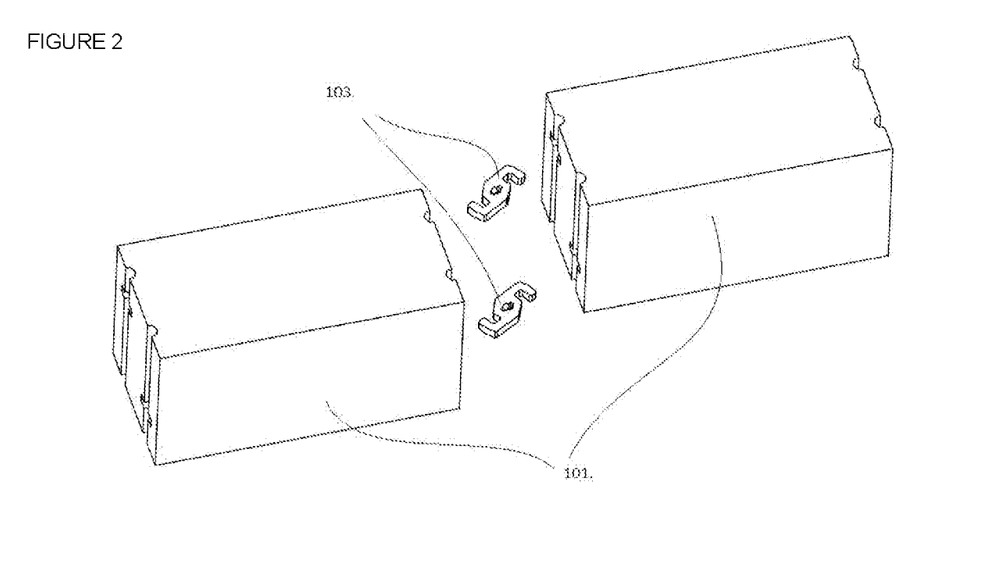
FIG. 2 presents an exemplary overview of an assembly figure of the furniture arrangement according to the invention, where the module furniture parts and attachment components are separated.

FIG. 2 presents an overview of an assembly figure of the mention, where the module furniture parts 101 and attachment components 103 are separated.

Figure 3:
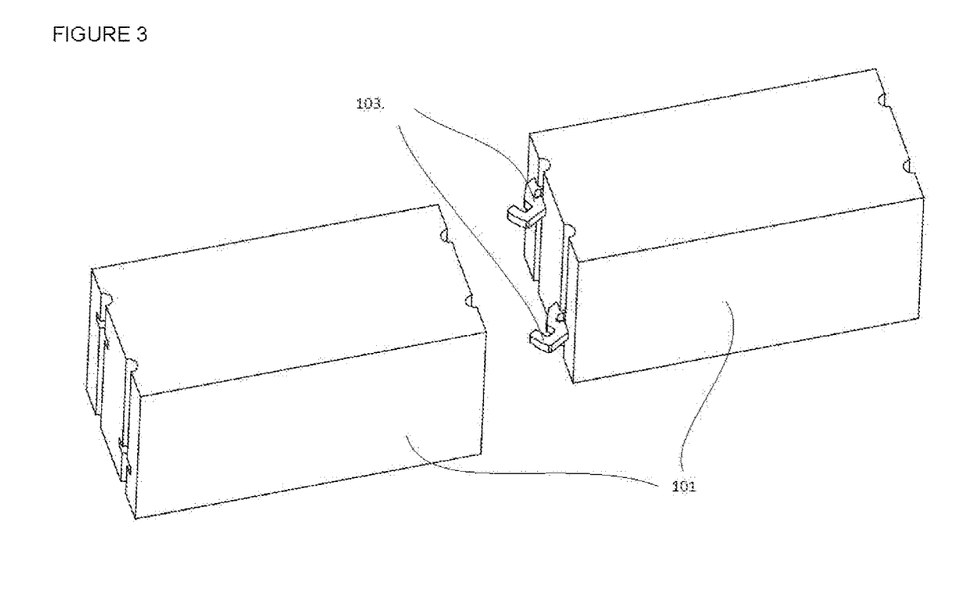
FIG. 3 presents an exemplary overview of an assembly figure of the furniture arrangement according to the invention, where the module furniture parts are separated and attachment components are located into the other module furniture part.

FIG. 3 presents an assembly figure of the invention, where the module furniture parts 101 are separated and attachment components 103 are located into the other module furniture part.

Figure 4:
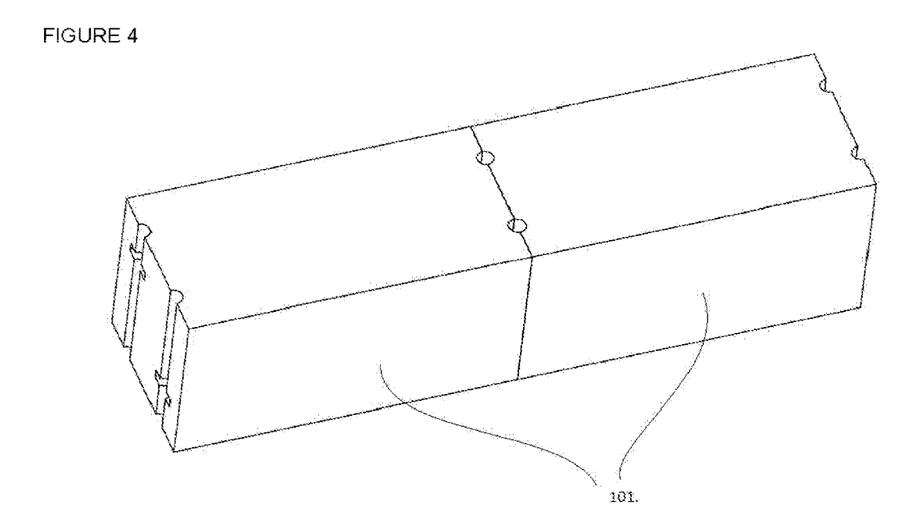
FIG. 4 presents an exemplary overview of an assembly figure of the furniture arrangement according to the invention, where the module furniture parts are attached together and attachment components are located into the module furniture parts.

FIG. 4 presents an assembly figure of the invention, where the module furniture parts 101 are attached together and attachment components 103 are located into the module furniture parts.

Figure 5:
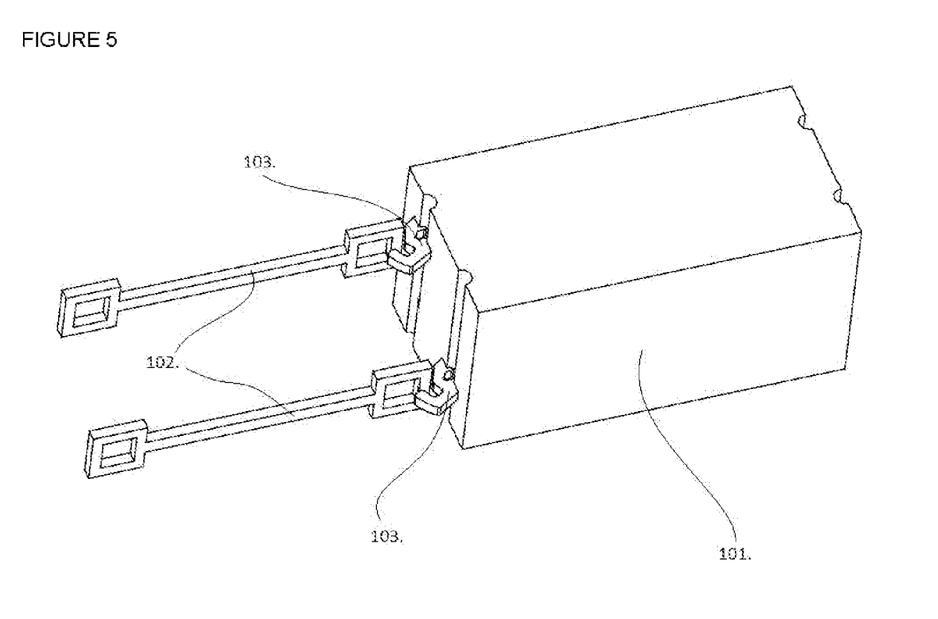
FIG. 5 presents an exemplary overview of an assembly figure of the furniture arrangement according to the invention, where a molded surface material of the second module furniture part has been removed.

FIG. 5 presents an assembly figure of the invention, where the module furniture parts 101 are attached together and attachment components 103 are located into the module furniture parts. A molded surface material of the other module furniture part 101 has been removed.

Figure 6:
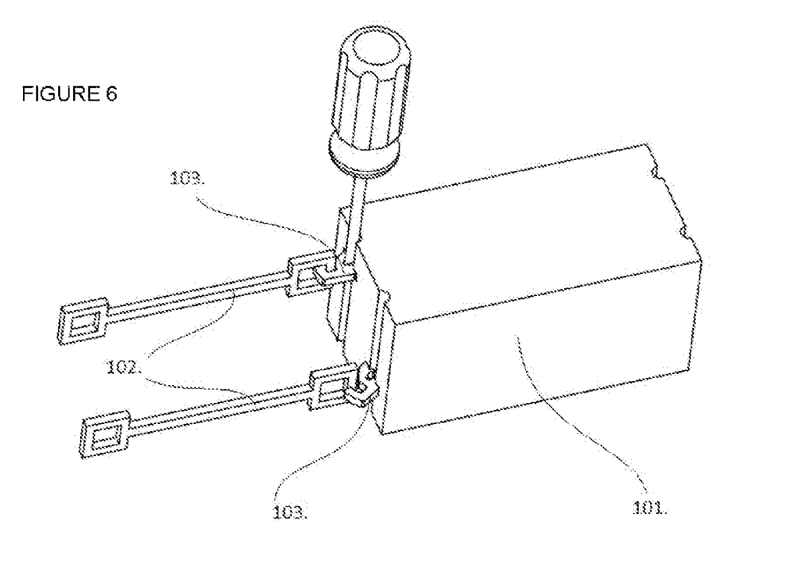
FIG. 6 presents an exemplary overview of an assembly figure of the furniture arrangement according to the invention, where the module furniture parts are attached together and attachment components are located into the module furniture parts, and the other attachment component is turned to a locking position by using a tool.

FIG. 6 presents an assembly figure of the invention, where the module furniture parts 101 are attached together and attachment components 103 are located into the module furniture parts, and the other attachment component is turned to a locking position by using a tool 150. A molded surface material of the other mod furniture part 101 has been removed.

Figure 7:
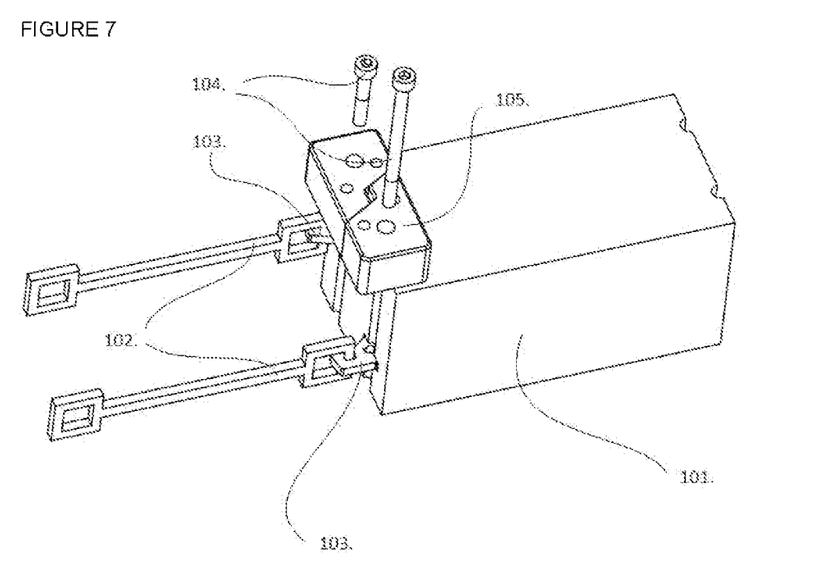
FIG. 7 presents an exemplary overview of an assembly figure of the furniture arrangement according to the invention, where an actuator is located onto the surface of module furniture part, and damping components are ready for fixing the actuator on the surface of the module furniture part.

FIG. 7 presents an assembly figure of the invention, where the module furniture parts 101 are attached together and attachment components 103 are located into the other module furniture parts and turned to a locking position by using a tool 150. An actuator (105) is located onto the surface of module furniture part, and clamping components (104) are ready for fixing the actuator 105 onto the surface of the module furniture part 101. A moped surface material of the other module furniture part 101 has been removed.

Figure 8:
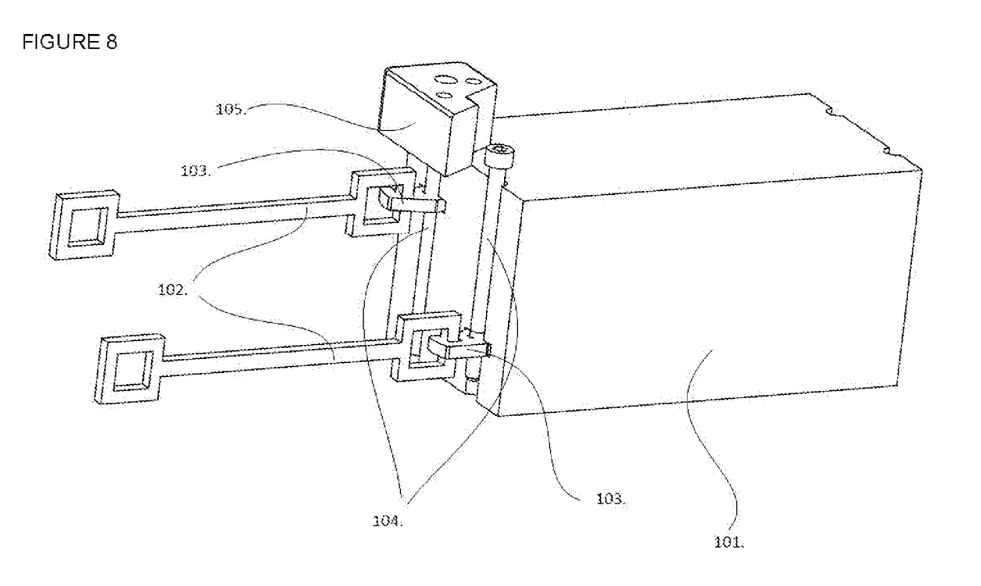
FIG. 8 presents an exemplary overview of an assembly figure of the furniture arrangement according to the invention, where the module furniture parts are attached together and attachment components are located into the module furniture parts and turned to a locking position by using a tool.

FIG. 8 presents an assembly figure of the invention, where the module furniture parts 101 are attached together and attachment components 103 are located into the other module furniture parts and turned to a locking position by using a tool 150. An actuator 105 is located onto the surface of module furniture part, and clamping components 104 are ready for fixing the actuator 105 onto the surface of the module furniture part 101. A molded surface material of the other module furniture part 101 and half of the actuator surface has been removed in the figure.

Figure 9:
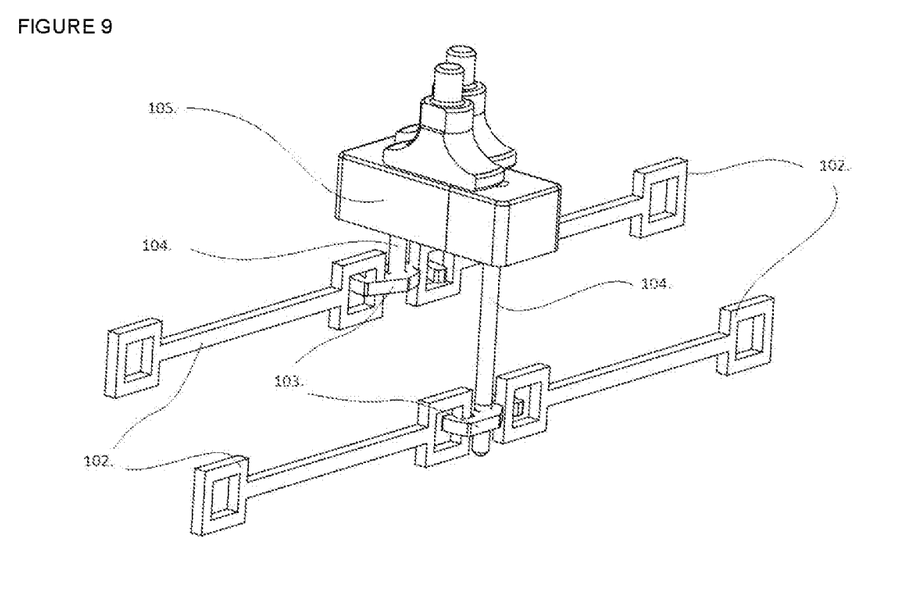
FIG. 9 presents a corresponding situations in figure but molded surface materials of the both module furniture parts have been removed, and the entire actuator has been presented.

FIG. 9 presents a corresponding situation as in FIG. 8, but molded surface materials of the both module furniture parts 101 have been removed, and the entire actuator has been presented.

Figure 10:
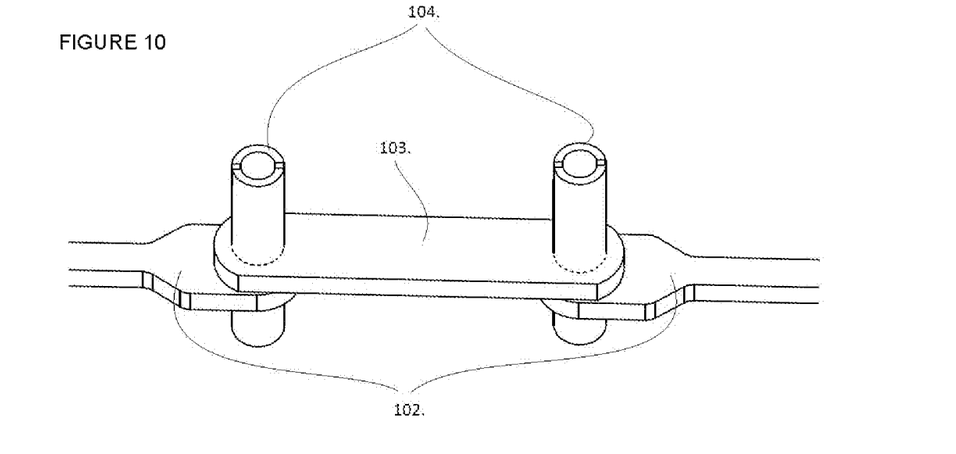
FIG. 10 presents an exemplary overview of an assembly figure of the invention, wherein at least one clamping component has an eccentric feature, and by rotating it is formed force that pulls support structures together.

FIG. 10 presents an overview of an assembly figure of the invention, wherein at least one damping component 104 has an eccentric feature, and by rotating it, is formed force that pulls support structures 102 together. The clamping component 104 has a feature that it is locked in the strongest pulling position. By adjusting length of the damping components electricity can be conducted to the surface of the module furniture part and at the same time the'actuator 105 is fixed onto the surface of the module furniture parts 101, 106, 107, 108.

Figure 11:
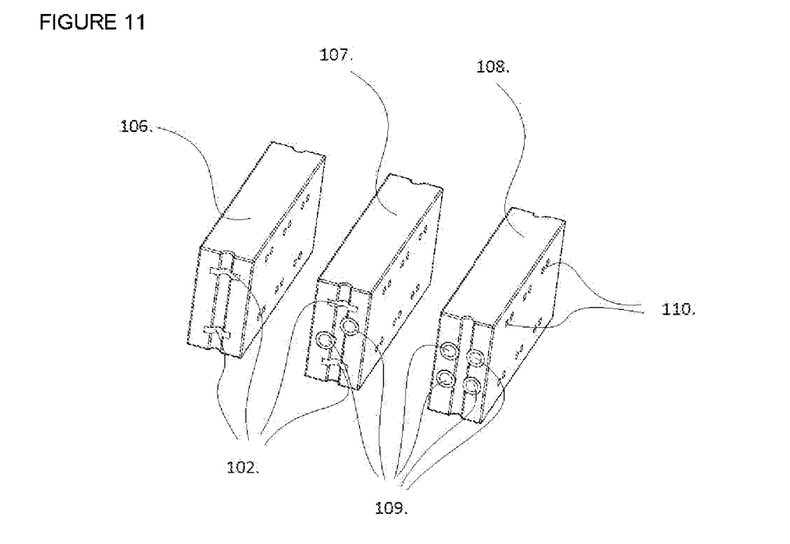
FIG. 11 presents an embodiment according to the invention, wherein is achieved sandwich shaped module furniture parts performing different kinds of use purposes.

FIG. 11 presents an embodiment according to the invention, wherein is achieved sandwich shaped module furniture parts performing different kinds of use purposes: module furniture part (106) conducting electricity, module furniture part 106 conducting electricity, which module furniture part have inside integrable piping as its feature for transferring liquid and gas, and a pipe module furniture part 108, which does not include a support structure. Module furniture parts 106, 107, 108 are switchable to each other via at least one clamping component 104 from the direction of openings of clamping components in the sandwich module when clamping components conduct electricity from one module to other in the transversal direction of longitudinally locating support structures 102 of the module furniture parts 106, 107, 108.

Figure 12:
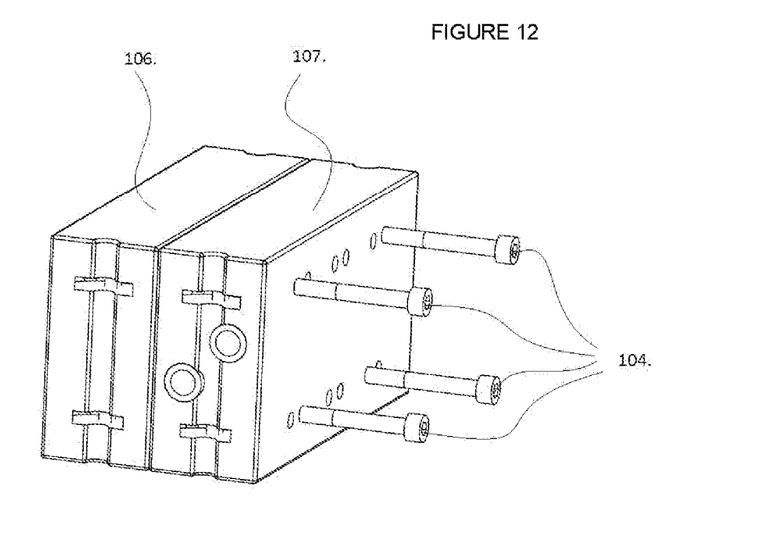
FIG. 12 presents an embodiment according to the invention, wherein two sandwich shaped module furniture parts are attached together being ready to be fixed by using clamping components.

FIG. 12 presents an embodiment according to the invention, wherein two sandwich module furniture parts 106, 107 are attached together being ready to be fixed by using clamping components.

Figure 13:
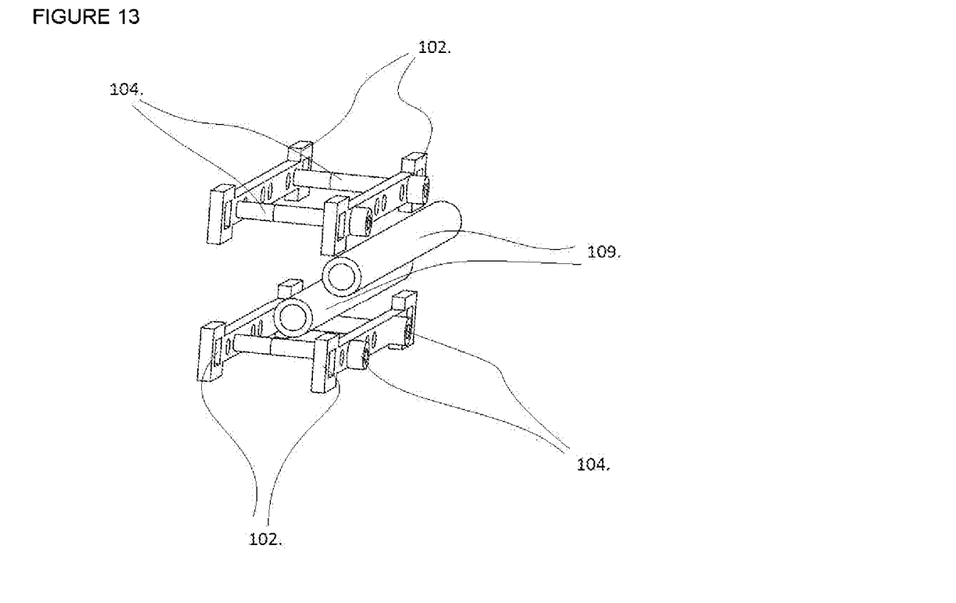
FIG. 13 presents an embodiment according to the invention, wherein sandwich shaped module furniture parts located according to the FIG. 11 are fixed together by using clamping components.

FIG. 13 presents an embodiment according to the invention, wherein sandwich shaped module furniture parts 106, 107 located according to the FIG. 11 are fixed together by using clamping components 104, which conduct electricity between sandwich module furniture parts or, when necessary, by adjusting length of the clamping component to surface of the sandwich module part.

Figure 14:
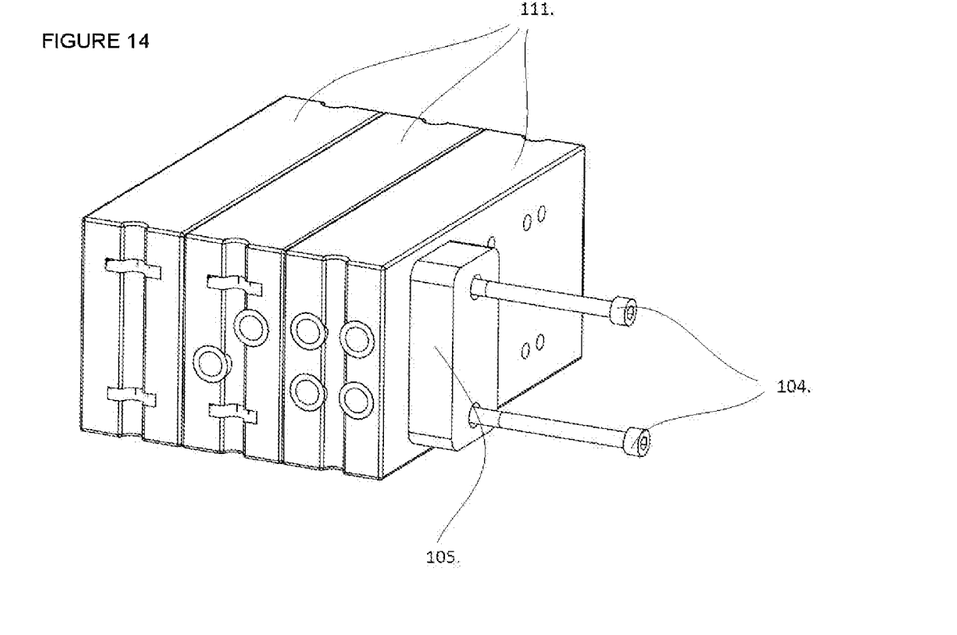
FIG. 14 presents an embodiment according to the invention, wherein sandwich shaped module furniture parts are fixed together, and an actuator is located onto the surface of the outermost module furniture part.

FIG. 14 presents an embodiment according to the invention, wherein sandwich shaped module furniture parts are fixed together, and an actuator 105 is located onto the surface of the outermost module furniture part, which actuator is fixing via the damping components 104 through the sandwich module furniture part onto its surface.

Figure 15:
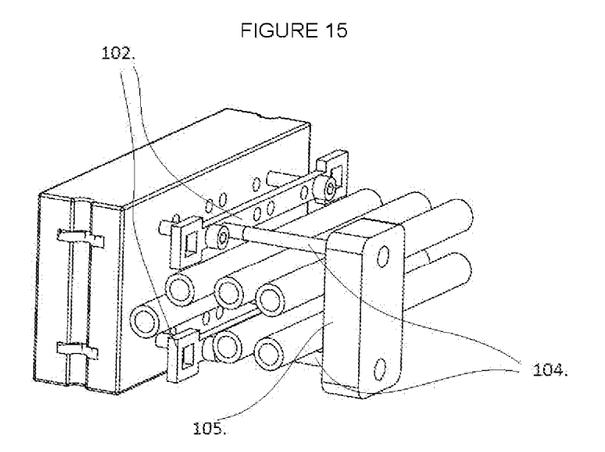
FIG. 15 presents an embodiment according to the invention, wherein sandwich shaped module furniture parts are fixed together, and an actuator is located onto the surface of the outermost module furniture part. Molded surface material of the middle and right-side module furniture parts have been removed.

FIG. 15 presents an embodiment according to the invention, wherein sandwich shaped module furniture parts are fixed together, and an actuator 105 is located onto the surface of the outermost module furniture part and molded surface material of the middle and right-side module furniture parts have been removed.

Figure 16:
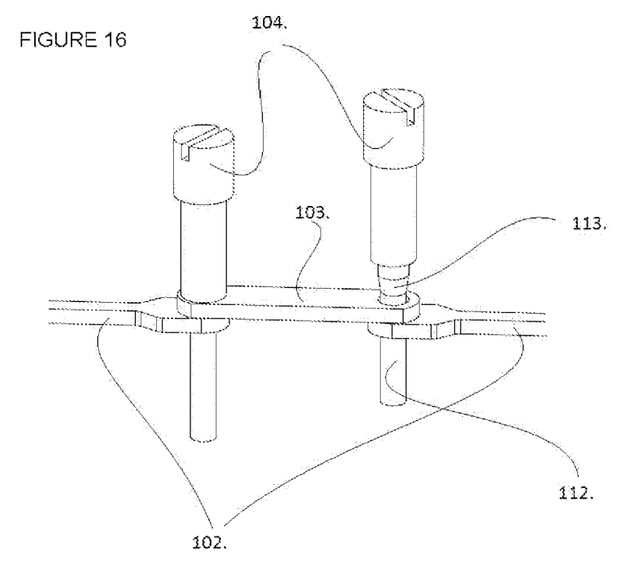
FIG. 16 presents an overview of an assembly figure of the furniture arrangement according to the invention, wherein a thread has been formed to end of at least one clamping component, and after the thread conically outwards growing shape.

FIG. 16 presents an overview of an assembly figure of the invention, wherein a thread has been formed to end of at least one clamping component 104, and after the thread 112 is conically outwards growing shape 113. At least one end of the attachment component 103 is provided with an aperture in which the thickest part of the conical shape 113 can move in the longitudinal direction of the attachment component 103 at least in the amount of clamping capacity of the conical shape. To the ends 102 of the support structure 102 is formed a threaded hole, wherein the clamping component 104 rotates, and the conical shape 113 tightens by means of the attachment component 103 support structures to each other, and the modular furniture parts are fixed to each other. Length of the clamping component 104 can be adjusted to conduct electricity to the surface of the module furniture part and at the same time the actuator 105 is fixed onto the surface of the modular furniture parts 101, 106, 107, 108.

Figure 17:
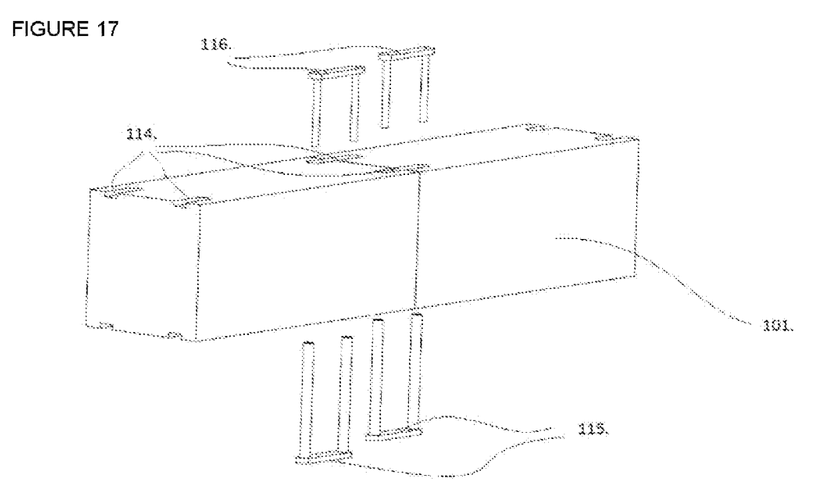
FIG. 17 presents an overview of an assembly figure of the invention, wherein module furniture parts are located against each other, and female attachment component and male attachment component are ready to be installed for locking module furniture parts together.

FIG. 17 presents an, overview of an assembly figure of the invention, wherein module furniture parts 101, 106, 107, 108 are located against each other, and female attachment component 115 and male attachment component 116 are ready to be installed for locking module furniture parts 101, 106, 107, 108 together. The features of the female attachment component 115 and the male attachment component 116 include at least the interlocking electrically and mechanically to each other and as a potential feature, alternatively or in combination with the previous feature fixing of the locking component into a mounting groove (114) of the surface of the module furniture part 0.

Figure 18:
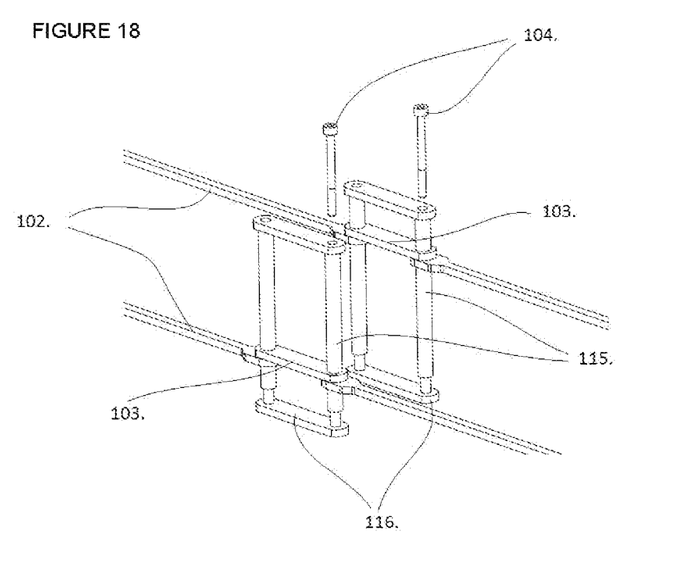
FIG. 18 presents an overview of an assembly figure of the invention, where in the attachment technique according to the FIG. 17 a molded surface material has been removed. Female attachment components and male attachment components are installed in a fixed position within each other.

FIG. 18 presents an overview of an assembly figure of the invention, where in the attachment technique according to the FIG. 17 a molded surface material has been removed. Female attachment components 115 and male attachment components 116 are installed in a fixed position within each other. Clamping components 104 are ready to pull the female attachment components 115 and the male attachment components 116 against each other and, if necessary, to conduct electricity to surface of the module furniture part 101, 106, 107, 108, and to attach the actuator 105 against the surface of the module furniture part 101, 106, 107, 108. The attachment components 103 according to the FIG. 18 strengthen fixing of the support structures 102 to each other and according to a technically different embodiment of attachment components 103 are excluded from the arrangement. To the attachment component is obtained a shape, which have equal and attractive shape to pull them against each another, and said shape is also obtained to the male attachment component.

Figure 19:
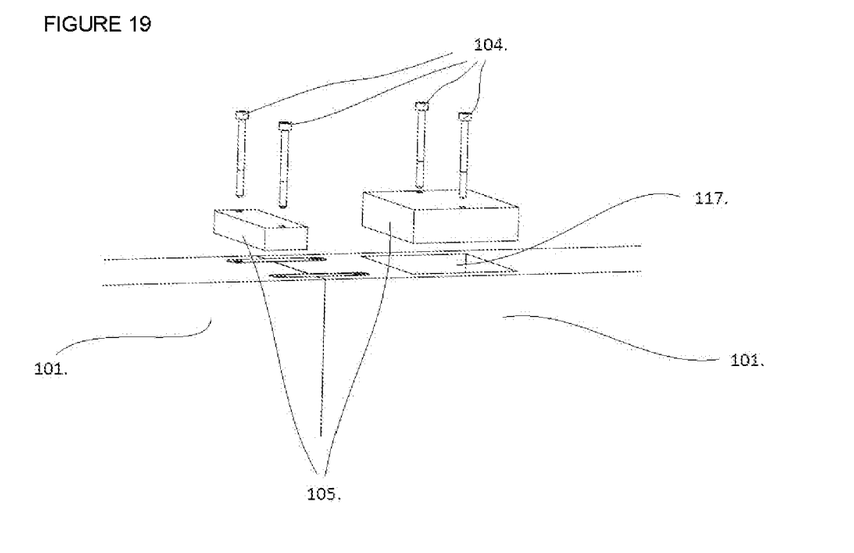
FIG. 19 presents an overview of an assembly figure of the invention, where the actuators are ready to be installed onto the surface of the module furniture part to which an installation state of the actuator has been initiated.

FIG. 19 presents an overview of an assembly figure of the invention, where the actuators 105 are ready to be installed onto the surface of the module furniture part 101, 106, 107, 108 to which an installation state of the actuator has been initiated, whose size is possible to be adjusted according to required space of the actuator 105 and the amount of which in the module furniture part can be varied or omitted entirely. The actuator is provided with a function part by molding or otherwise by mechanically attaching. Actuators are categorized to certain standard sizes as well as the attachment mechanisms. This technical solution allows the actuator 105 to be embedded inside the module furniture part 101, 106, 107, 108, keeping the surfaces steady, integration of various functions inside the module furniture parts 101, 106, 107, 108 and exchange of them without a need to replace a modular furniture part 101, 106, 107, 108. Clamping components 104 can transfer power to the actuator 105 and the control can take place wirelessly.

All the technical solutions of the invention, in which is fixed mechanically some parts, shapes, surface materials, components or other technical characteristics to each other or alternatively is wanted to obtain outwards pushing force, attachment methods according to the descriptions and claims can be replaced by magnets or by a corresponding way electrically obtained magnetic field.

In all the technical solutions of the invention, in which is fixed mechanically some parts, shapes, surface materials, components or other technical characteristics to each other, onto surfaces of all the obtained components can be formed electrically insulating layer, which has characteristics and shape on the basis of which electrical conductivity can be restricted between different components and obtain electrically safe embodiment to install and use the modular furniture arrangement.

Magnetic characteristics can be obtained to attachment components 102 and clamping components 104 of all the technical solutions of the invention, in which magnetically attractive surface material adheres onto the surface of the module furniture part 101, 106, 107, 108.

Figure 20:
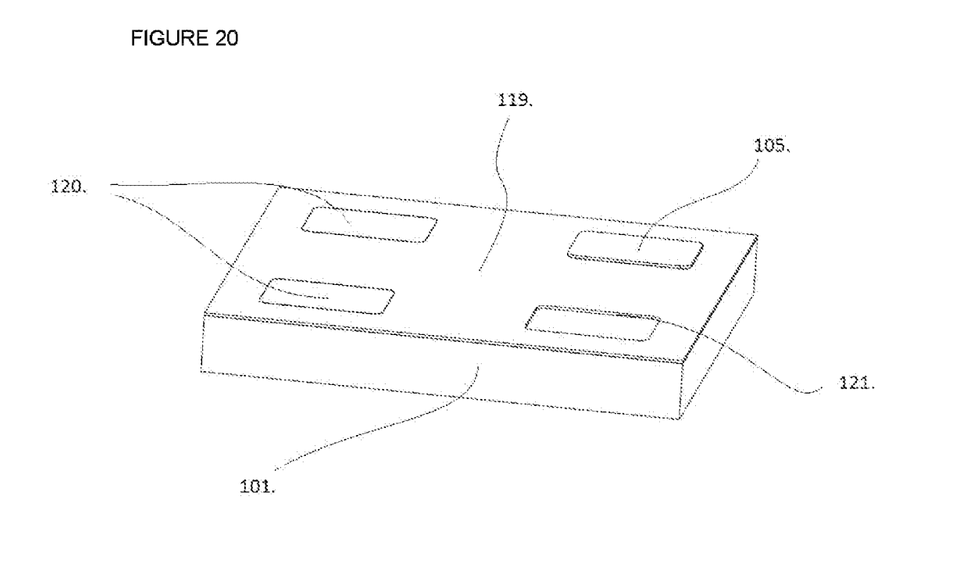
FIG. 20 presents an overview of an assembly figure of an intelligent modular surface arrangement according to the invention, wherein onto the surface of combination of the module furniture parts is formed magnetic surface material.

FIG. 20 presents an overview of an assembly figure of an intelligent modular surface arrangement 118 according to the invention, wherein onto the surface of combination of the module furniture parts 101, 106, 107, 108 is formed magnetic surface material 119, which is provided with desired number of openings of standardized size and shape, and into the openings are installed exchangeable and depending on the size and shape fixing and positioning advertisement materials 120. Into the standardized openings of surface of the modular furniture part can be fixed and attached actuators 105, which can have a need to come according to their function through the surface or the alternatively they can locate as hidden below the surface. Magnetic or magnetically attractive surface material adheres by means of attachment components 103, clamping components 104 or by means of magnetic characteristics or shape of an actuator 105, or by means of other mechanical positioning means, which can be between the surfaces installable locking means on the basis of its shape or a shape formed to the module furniture part 101, 106, 107, 108. Adhesive tape or mechanical label can also be used as a means for adhering.

Intelligent modular surface arrangement for creating advertising, atmosphere and communication:

The traditional way to advertise via the furniture is to attach various advertisement tapes and labels onto the surface of furniture, which gave rise to the original surfaces suffering from installation work and the use of different chemicals. The worn surfaces of the furniture lead to a situation, in which the surfaces have to be renewed, which is tedious and expensive for owners of the furniture.

The intelligent, modular surface arrangement includes a magnetically or mechanically folding roller surface material, which is provided with an entire system of the openings, which is being standardized. According to different needs contents of the openings can be changed, which are different advertising surface materials instead of advertisement stickers or, for example, inside or onto the surface of module furniture part fixable actuators, designed to obtain the effect, such as sound, light, picture or other audiovisual activities, which are wanted to be brought through the surface materials.

The intelligent, modular surface arrangement includes a method in which the client creates furniture according to his needs, by online design program, by which the client positions the wanted advertisements, actuators and other openings onto the surface of his furniture. The online design program sends a need list of the modular furniture parts of the furniture arrangement ordered by the client to the production with the surface materials, which forms configuration information for the user. Modular furniture parts with surface materials and advertisements are delivered to the client in a logistically reasonable and compact package. As the needs change the client can make modifications by online design program to furniture shape and surface material with the advertisements. Module furniture parts and advertisements fit always onto their positions, when the online design program has them produced.

Modular structures according to the invention can be also utilized for example in wall structures or in ceiling structures.

The invention claimed is:

1. Modular furniture arrangement comprising electrically and mechanically attachable module furniture parts (101), characterized in that the modular furniture arrangement comprises for fixing module furniture parts (101) to each other and for conducting electricity to the at least one surface level of the module furniture part: said at least two module furniture parts (101) attachable electrically and mechanically to each other, into which is formed at least two mutually electrically insulated electrically conductive support structures (102), and at least two attachment components (103) for mechanical fastening the support structures (102) of the module furniture parts (101) to each other and for conducting electricity between the module furniture parts (101), and to be attached to the attachment components (103) of the module furniture parts (101) and conducting electricity in the direction of the surface of the module furniture part at least two clamping components (104) for fixing the support structures (102) via the attachment component (103) to each other.

2. Modular furniture arrangement according to claim 1, characterized in that the modular furniture arrangement comprises at least one electric actuator (105) operating by electricity and the at least one clamping component (104) for fixing the actuator (105) to the surface of the module furniture part (101) by adjusting the component length and for conducting electricity from the module furniture part (101) to said actuator (105) for its use.

3. Modular furniture arrangement according to claim 1, characterized in that the modular furniture arrangement comprises the attachment component (103) that fix the support structures of module furniture parts (101) to each other via a groove formed to an attachment surface of the module furniture parts (101) by using a tool (150) with the attachment component (103) for performing said fixing of the support structures.

4. Modular furniture arrangement according to claim 1 characterized in that the modular furniture arrangement comprises the attachment component (103), into which is formed with a threaded fastening hole (122), and the support structures (102) of the module furniture parts (101) fix to each other by rotation movement via the threaded fastening hole (122).

5. Modular furniture arrangement according to claim 1, characterized in that the modular furniture arrangement comprises the attachment component (103), which is made of an electrically nonconductive material.

6. Modular furniture arrangement according to claim 1, characterized in that the modular furniture arrangement comprises the attachment component (103), which is made of an electrically conductive material.

7. Modular furniture arrangement according to claim 1, characterized in that the modular furniture arrangement comprises the clamping component (104), which fix to the attachment component (103) via a thread and fix the support structures (102) of the module furniture parts (101) to each other.

8. Modular furniture arrangement according to claim 7, characterized in that the modular furniture arrangement comprises the clamping component (104), and the actuator (105) is fixed to the surface of Page 1 the module furniture part (101) by increasing length of the locking component, and the actuator is electrically connected to the modular furniture arrangement.

9. Modular furniture arrangement according to claim 1, characterized in that the modular furniture arrangement comprises the clamping component (104) having a rotating shaft, and in the end of which is eccentric shape, that locks the support structures (102) of the module furniture part (101) when the clamping component (104) is rotated.

10. Modular furniture arrangement according to claim 1, characterized in that the modular furniture arrangement comprises an actuator, which is fixable to surface of the module furniture part (101) with screws (104) receiving electricity for its operation via the screws (104).

11. A modular budding element arrangement, comprising: electrically and mechanically attachable modular panel-like building elements (101), characterized in that the modular panel-like building element arrangement comprises for fixing the modular panel-like building elements (101) to each other and for conducting electricity to the at least one surface level of the modular panel-like building element:
   said at least two modular panel-like building elements (101) attachable electrically and mechanically to each other, into which is formed at least two mutually electrically insulated electrically conductive support structures (102), and
   at least two attachment components (103) for mechanical fastening the support structures (102) of the modular panel-like building elements (101) to each other and for conducting electricity between the modular panel-like building elements (101), and
   to be attached to the attachment components (103) of the modular panel-like building elements (101) and conducting electricity in the direction of the surface of the modular panel-like building element at least two clamping components (104) for fixing the support structures (102) via the attachment component (103) to each other.

12. A modular building element arrangement according to claim 11, wherein the modular panel-like building elements are attached to each other to form a wall structure.

13. A modular building element arrangement according to claim 11, wherein the modular panel-like budding elements are attached to each other to form a roof structure.

14. A modular building element arrangement according to claim 11, wherein the modular panel-like building elements are attached to each other to form a floor structure.

* * * * *